(12) United States Patent
Hausmann et al.

(10) Patent No.: US 8,940,204 B1
(45) Date of Patent: Jan. 27, 2015

(54) METHOD OF MANUFACTURING RUBBER AND POLYOLEFIN SOLE ASSEMBLY

(71) Applicant: NIKE, Inc., Beaverton, OR (US)

(72) Inventors: Stephan Hausmann, Happy Valley, OR (US); Denis Schiller, Vancouver, WA (US); Bryan K. Youngs, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 14/247,727

(22) Filed: Apr. 8, 2014

Related U.S. Application Data

(63) Continuation of application No. 14/057,269, filed on Oct. 18, 2013, now Pat. No. 8,747,711.

(51) Int. Cl.
   *B29C 45/40* (2006.01)
(52) U.S. Cl.
   USPC .................................. 264/45.1; 264/45.4
(58) Field of Classification Search
   CPC ..................................................... B29D 35/122
   USPC ................................................ 264/45.1, 45.4
   See application file for complete search history.

(56) References Cited

U.S. PATENT DOCUMENTS

| | | | |
|---|---|---|---|
| 4,418,483 A * | 12/1983 | Fujita et al. ................... 36/28 |
| 5,147,589 A * | 9/1992 | Chang et al. ............. 264/45.1 |
| 5,926,974 A | 7/1999 | Friton |
| 6,018,889 A | 2/2000 | Friton |
| 6,226,896 B1 | 5/2001 | Friton |
| 6,743,385 B2 * | 6/2004 | Wang ............................ 264/46.4 |
| 7,234,251 B2 | 6/2007 | Fuerst et al. |
| 7,543,399 B2 | 6/2009 | Kilgore et al. |
| 7,594,345 B2 | 9/2009 | Fusco |
| 7,762,011 B2 | 7/2010 | Fuerst et al. |
| 2004/0154188 A1 | 8/2004 | Laska |
| 2006/0125134 A1 | 6/2006 | Lin |
| 2008/0073806 A1 * | 3/2008 | Wang ............................ 264/45.1 |
| 2010/0098797 A1 * | 4/2010 | Davis et al. ................ 425/129.2 |
| 2010/0242312 A1 | 9/2010 | Lim et al. |
| 2011/0047721 A1 | 3/2011 | Sills et al. |
| 2011/0225845 A1 | 9/2011 | Dean et al. |
| 2011/0232008 A1 | 9/2011 | Crisp |
| 2011/0232135 A1 | 9/2011 | Dean et al. |
| 2011/0247239 A1 | 10/2011 | Berend et al. |

* cited by examiner

FOREIGN PATENT DOCUMENTS

FR    2664848 A1    1/1992

OTHER PUBLICATIONS

Non-Final Office Action issued in corresponding U.S. Appl. No. 14/057,269, dated Dec. 11, 2013.

*Primary Examiner* — Galen Hauth
(74) *Attorney, Agent, or Firm* — Banner & Witcoff, Ltd.

(57) ABSTRACT

A sole assembly is formed by preheating a mold assembly, placing a quantity of rubber in a first portion of a lower recess of a mold assembly; placing a middle plate in contact with a bottom plate, and an upper plate in contact with the middle plate; subjecting the top, middle, and bottom plates to heat to semi-cure the rubber in the lower recess to form an outsole member; separating the top plate, the middle plate, and the bottom plate; placing the top plate in contact with the bottom plate, with polyolefin forming a midsole above the semi-cured rubber; moving the movable insert upwardly with respect to the top plate; subjecting the top and bottom plates to heat such that the polyolefin expands within the sole recess and the polyolefin and rubber in the sole recess fully cure, cross-link, and bond to one another to form a sole assembly; cooling the top and bottom plates; and removing the sole assembly.

20 Claims, 8 Drawing Sheets

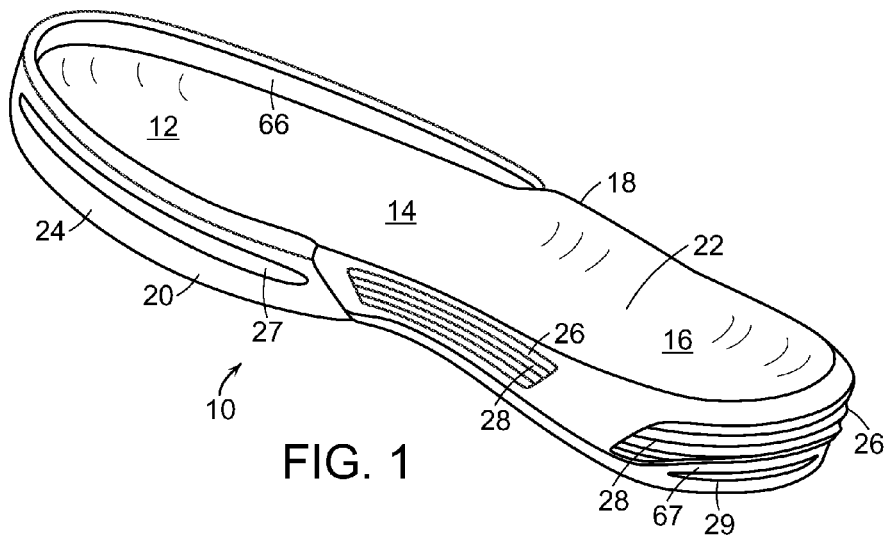
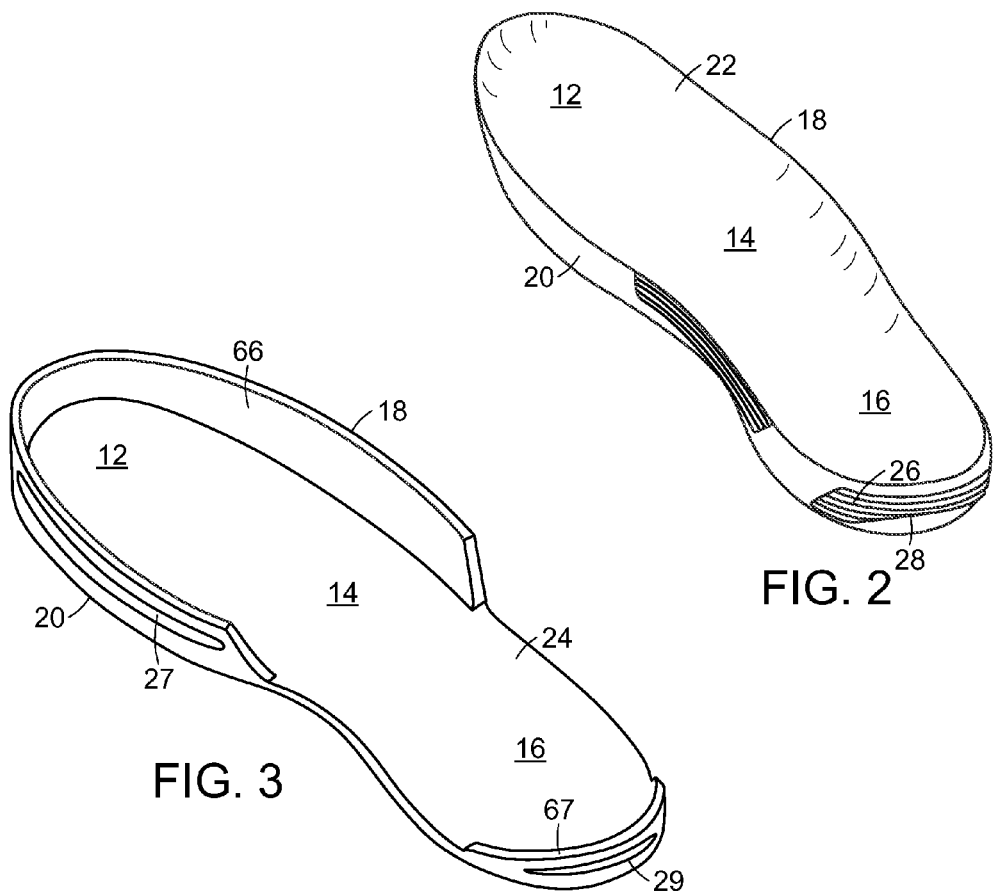

METHOD OF MANUFACTURING RUBBER AND POLYOLEFIN SOLE ASSEMBLY

CROSS-REFERENCE TO RELATED APPLICATION

This application is a continuation of pending U.S. patent application Ser. No. 14/057,269, filed on Oct. 18, 2013, the entire contents of which is incorporated herein by reference in its entirety.

FIELD OF THE INVENTION

Aspects of this invention relate generally to a method of manufacturing a sole assembly, and, in particular, to a method of manufacturing a sole assembly having a polyolefin midsole member and a rubber outsole member.

BACKGROUND OF THE INVENTION

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running.

The sole assembly generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole, which is conventionally secured to the upper along the length of the upper, forms a middle layer of the sole assembly and is primarily responsible for attenuating ground reaction forces. The outsole forms the ground-contacting element of footwear and is usually fashioned from a durable, wear-resistant material that includes texturing to improve traction.

The midsole may be primarily formed from a resilient, polymer foam material, such as a polyolefin (ethylvinylacetate (EVA) being one example), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators. The outsole provides the ground-engaging portion of the footwear, and may be formed of rubber, providing superior traction and wear characteristics.

It would be desirable to provide a method of manufacturing a sole assembly for an article of footwear that reduces or overcomes some or all of the difficulties inherent in prior known processes. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a method of manufacturing a sole assembly formed of a polyolefin and rubber. In accordance with a first aspect, a method of forming a sole assembly uses a mold assembly including a top plate having a bottom surface. A middle plate is positioned beneath the top plate and has a top surface and a bottom surface. The bottom surface of the top plate and the top surface of the middle plate cooperate to define an upper recess. A bottom plate is positioned beneath the middle plate and has a top surface. The top surface of the bottom plate and the bottom surface of the middle plate cooperate to define a lower recess. The bottom surface of the top plate and the top surface of the bottom plate are configured such that when the top plate and bottom plate are in contact with one another they cooperate to define a sole recess. The sole recess has a volume that is larger than a volume of the upper recess and a volume of the lower recess combined. The mold assembly is preheated and a quantity of rubber is placed in a first portion of the lower recess. The lower surface of the middle plate is placed in contact with the upper surface of the bottom plate, and the lower surface of the upper plate is placed in contact with the upper surface of the middle plate. The top plate, middle plate, and bottom plate are subjected to heat to semi-cure the rubber in the lower recess to form an outsole member. The top plate, middle plate, and bottom plate are separated, and the lower surface of the top plate is placed in contact with the upper surface of the bottom plate, wherein a quantity of a polyolefin forming a midsole member is in the sole recess above the semi-cured rubber. The top plate and bottom plate are subjected to heat such that the polyolefin expands within the sole recess and the polyolefin and rubber in the sole recess fully cure, cross-link, and bond to one another to form a sole assembly for an article of footwear. The top plate and the bottom plate are cooled, and the top plate is removed from the bottom plate, and the sole assembly is removed from the sole recess.

In accordance with another aspect, a sole assembly may be formed with a mold assembly including a top plate having a bottom surface and a middle plate positioned beneath the top plate and having a top surface and a bottom surface. The bottom surface of the top plate and the top surface of the middle plate cooperate to define an upper recess. A bottom plate is positioned beneath the middle plate and has a top surface. The top surface of the bottom plate and the bottom surface of the middle plate cooperate to define a lower recess. The bottom surface of the top plate and the top surface of the bottom plate are configured such that when the top plate and bottom plate are in contact with one another they cooperate to define a sole recess. The sole recess has a volume that is larger than a volume of the upper recess and a volume of the lower recess combined. The mold assembly is preheated and a quantity of rubber is placed in a first portion of the lower recess. The lower surface of the middle plate is placed in contact with the upper surface of the bottom plate. A quantity of a polyolefin is placed in a first portion of the upper recess. The lower surface of the upper plate is placed in contact with the upper surface of the middle plate. The top plate, middle plate, and bottom plate are subjected to heat to semi-cure the rubber in the lower recess to form an outsole member and to semi-cure the polyolefin in the upper recess to form a midsole member. The top plate, middle plate, and bottom plate are separated. The lower surface of the top plate is placed in contact with the upper surface of the bottom plate such that the semi-cured polyolefin midsole member contacts the semi-cured rubber outsole member in the sole recess. The top plate and bottom plate are subjected to heat such that the polyolefin expands within the sole recess and the polyolefin and rubber in the sole recess fully cure, cross-link, and bond to one another to form a sole assembly for an article of footwear. The top plate and the bottom plate are cooled. The top plate is removed from the bottom plate and the sole assembly is removed from the sole recess.

Features and advantages of manufacturing sole assemblies for footwear as disclosed here will be further understood from the following detailed disclosure of certain embodiments.

BRIEF DESCRIPTION OF THE DRAWINGS

FIG. 1 is a perspective view of a sole assembly including a midsole and an outsole bonded to the midsole.

FIG. 2 is a perspective view of the midsole of FIG. 1.

FIG. 3 is a perspective view of the outsole of FIG. 1.

Figure 4:
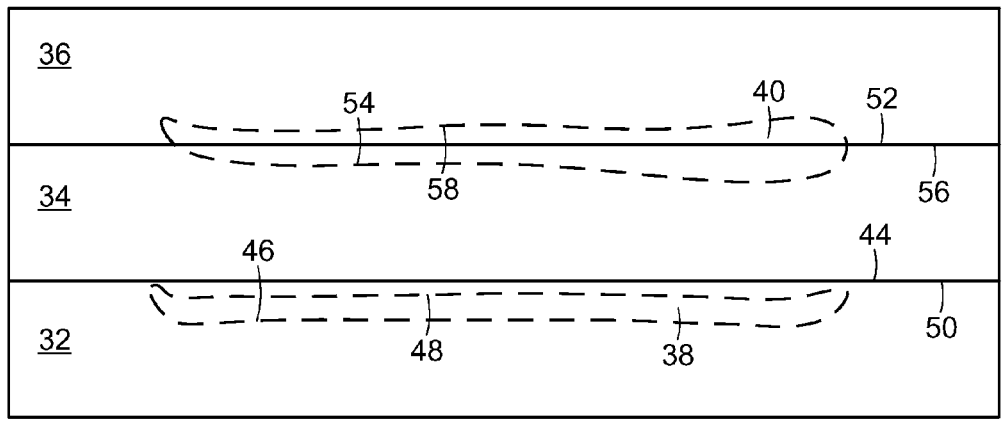
FIG. 4 is a schematic elevation view of a mold assembly used to form the midsole and the outsole of the sole assembly of FIG. 1.

The figures referred to above are not drawn necessarily to scale, should be understood to provide a representation of particular embodiments of the invention, and are merely conceptual in nature and illustrative of the principles involved. Some features of the mold assembly used to manufacture a sole assembly have been enlarged or distorted relative to others to facilitate explanation and understanding. The same reference numbers are used in the drawings for similar or identical components and features shown in various alternative embodiments. Mold assemblies for a sole assembly and methods of manufacture for such a sole assembly as disclosed herein would have configurations and components determined, in part, by the intended application and environment in which they are used.

DETAILED DESCRIPTION OF CERTAIN PREFERRED EMBODIMENTS

An illustrative embodiment of a sole assembly 10 of an article of footwear is shown in FIGS. 1-3. Sole assembly 10 is configured to be positioned below an upper (not shown) which defines a void or chamber for receiving a foot. For purposes of reference in the following description, sole assembly 10 may be divided into three general regions: a forefoot region 12, a midfoot region 14, and a heel region 16. Regions 12-16 are not intended to demarcate precise areas of sole assembly 10. Rather, regions 12-16 are intended to represent general areas of sole assembly 10 that provide a frame of reference during the following discussion. Although regions 12-16 apply generally to sole assembly 10, references to regions 12-16 also may apply specifically to any portion of an article of footwear within which sole assembly 10 is provided.

For purposes of reference, sole assembly 10 includes a lateral side 18 and an opposite medial side 20. Lateral side 18 is positioned to extend along a lateral side of the foot (i.e., the outside) and generally passes through each of regions 12-16. Similarly, medial side 20 is positioned to extend along an opposite medial side of the foot (i.e., the inside) and generally passes through each of regions 12-16.

Sole assembly 10 includes a midsole member 22 and an outsole member 24 positioned beneath midsole member 22. Midsole member 22 is primarily responsible for attenuating ground (or other contact surface) reaction forces to lessen stresses upon the foot and leg, and absorb energy. Midsole member 22 may also beneficially utilize such ground reaction forces for more efficient toe-off, and control potentially harmful foot motions, such as over pronation. Outsole member 24 forms a ground-engaging portion (or other contact surface-engaging portion) of sole assembly 10, and may include texturing to improve traction.

The sidewalls and other exterior surfaces of midsole member 22 and outsole member 24 may include surface irregularities, which serve an aesthetic purpose as well as helping in the molding process, as described in greater detail below. The surface irregularities can include, for example, projections and recesses. As seen in the embodiment illustrated in FIGS. 1 and 2, midsole member 22 may include a series of ribs 26 that are spaced apart by grooves 28. Ribs 26 and grooves 28 may extend about heel portion 16 and along midfoot portion 14 on medial side 20. Another set of ribs 26 and grooves 28 (not shown) may be found along midfoot portion 14 on lateral side 18. It is to be appreciated that midsole member 22 can include any number or projections and/or recesses on its exterior surface, that the projections and/or recesses can take on any desired shape.

Similarly, in the embodiment illustrated in FIGS. 1 and 3, outsole member 24 may include a groove 27 extending along forefoot portion 12 on medial side 20, and a corresponding groove (not shown) on lateral side 18. Outsole member 24 may also include a projection such as rib 29 extending about heel portion 16. Outsole 24 may also include surface irregularities on its bottom surface, as described in greater detail below. It is to be appreciated that outsole member 24 can include any number or projections and/or recesses on its exterior surface, that the projections and/or recesses can take on any desired shape.

A mold assembly 30 used to form sole assembly 10 is schematically illustrated in FIG. 4. Mold assembly 30 includes a bottom plate 32, a middle plate 34, and a top plate 36. Bottom plate 32 and middle plate 34 cooperate to define a lower recess 38 therebetween, in which outsole member 24 may be formed. Similarly, top plate 36 and middle plate 34 cooperate to define an upper recess 40 in which midsole member 22 may be formed. As described in greater detail below, in this configuration, mold assembly 30 may be used to partially cure or semi-cure each of midsole member 22 and outsole member 24.

Figure 5:
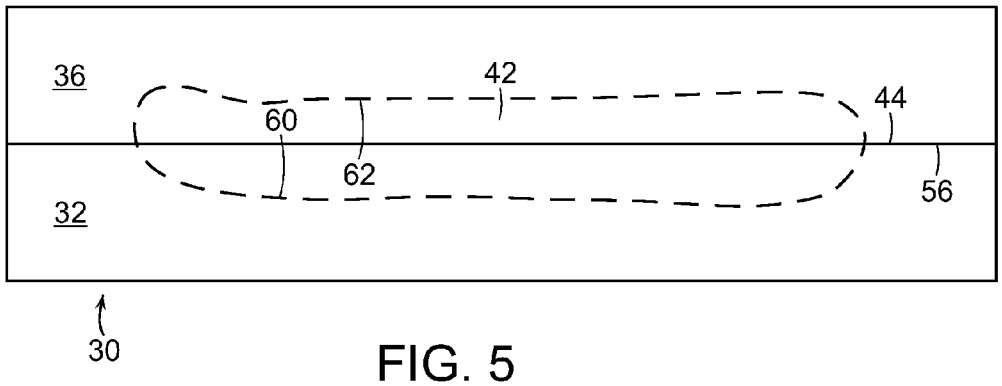
FIG. 5 is a schematic elevation view of the top plate and bottom plate of the mold assembly of FIG. 4 seen in abutting relationship.

As illustrated in FIG. 5, and described in greater detail below, sole assembly 10 may be further processed in mold assembly 30 by removing middle plate 34. Bottom plate 32 and top plate 36 are then positioned in abutting relationship and cooperate to define a sole recess 42 in which midsole member 22 and outsole member 24 may be fully and completely cured and bonded to one another to produce sole assembly 10 in its final form. Sole recess 42 is sized in a 1:1 relationship such that its dimensions match that of the final dimensions of sole assembly 10. Once removed from mold assembly 30, sole assembly 10 is in its completed form and can be attached to a lasted upper to complete an article of footwear.

Figure 6:
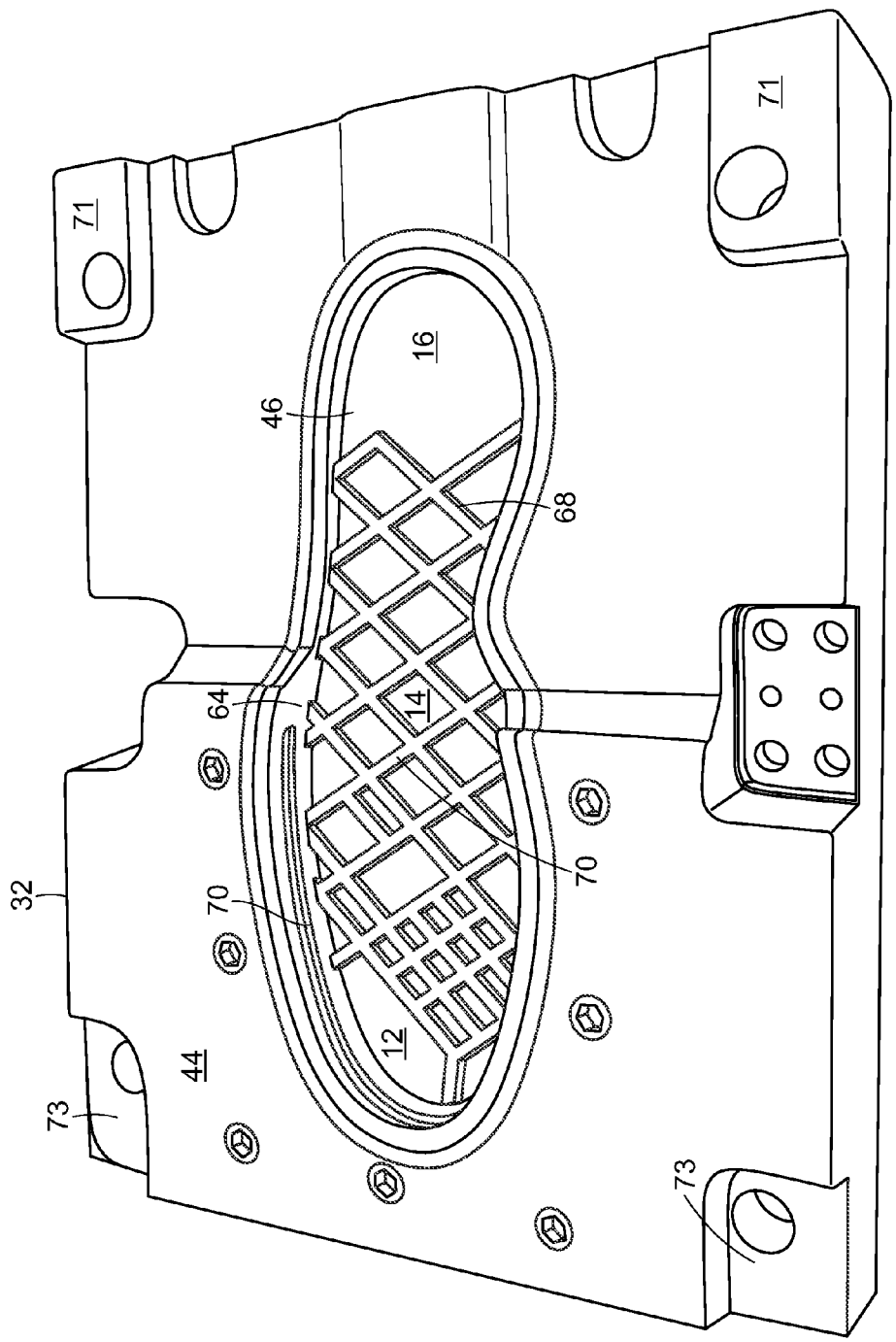
FIG. 6 is a perspective view of a top of the bottom plate of the mold assembly of FIG. 4.

As seen in FIG. 4, and in FIG. 6 below, a top surface 44 of bottom plate 32 defines a first portion 46 of bottom recess 38. A second portion 48 of bottom recess 38 is defined by a bottom surface 50 of middle plate 34, as seen in FIG. 4 and in FIG. 7 below. Similarly, a top surface 52 of middle plate 34 defines a first portion 54 of upper recess 40, as seen here and in FIG. 8 below, and a bottom surface 56 of top plate 36 defines a second portion 58 of upper recess 40, as seen here and in FIG. 9 below. As seen in FIG. 5, top surface 44 of bottom plate 32 defines a first portion 60 of sole recess 42, and bottom surface 56 of top plate 36 defines a second portion 62 of sole recess 42.

A first embodiment of a method of forming sole assembly 10 with mold assembly 30 will now be described in greater detail. Mold assembly 30 is preheated to a temperature between approximately 155° C. and approximately 175° C. A quantity of raw rubber is placed in first portion 46 of lower recess 38 of bottom plate 32, and then middle plate 34 is placed on top of bottom plate 32. It is to be appreciated that the rubber placed in lower recess 38 may be in any desired form. For example, the rubber may be in the form of a die-cut sheet or sheets of rubber. In other embodiments, the rubber may be in the form of pellets, or other shapes of ground-up rubber. Other suitable forms for the rubber in lower recess 38 will become readily apparent to those skilled in the art, given the benefit of this disclosure.

Suitable rubbers include polybutadiene, nitrile rubber, and polyisoprene, for example. In certain embodiments, the rubber is approximately 70% polybutadiene. Suitable rubbers may have a durometer of between approximately 62 and approximately 68 Shore A. The rubber may also include a curing agent. In certain embodiments, a peroxide-based curing agent, such as dicumyl peroxide may be used. The amount of curing agent may be between approximately 0.6% and approximately 1.5%. In other embodiments, a sulfur-based curing agent may be used.

A quantity of a polyolefin is then placed in first portion 54 of upper recess 40, and then top plate 36 is placed on top of middle plate 34. It is to be appreciated that the polyolefin placed in upper recess 42 may be in any desired form. For example, the polyolefin may be in the form of die-cut sheets or strips of polyolefin, or it may be in the form of pellets. Other suitable forms for the polyolefin in upper recess 42 will become readily apparent to those skilled in the art, given the benefit of this disclosure.

It is to appreciated that the polyolefin could be, but is not limited to, ethyl vinyl acetate (EVA), polyethylene (PE), or polypropylene (PP), for example. In embodiments where the polyolefin is EVA, it may have a Vinyl Acetate (VA) level between approximately 9% and approximately 40%. Suitable EVA resins include Elvax®, provided by DuPont, and Engage, provided by the Dow Chemical Company, for example.\

In certain embodiments, the polyolefin may be formed of a combination of high melt index and low melt index material. For example, the polyolefin may have a melt index between approximately 1 and approximately 50.

The polyolefin may also include various components including a blowing agent. The blowing agent may have a percent weight between approximately 10% and approximately 20%. Suitable blowing agents include azodicarboamide, for example. In certain embodiments, a peroxide-based curing agent, such as dicumyl peroxide may be used. The amount of curing agent may be between approximately 0.6% and approximately 1.5%. The polyolefin may also include homogenizing agents, process aids, and waxes. For example, a mixture of light aliphatic hydrocarbons such as Struktol® 60NS may be included. The polyolefin may also include other constituents such as a release agent (e.g., stearic acid), activators (e.g., zinc oxide), fillers (e.g., magnesium carbonate), pigments, and clays.

Top plate 36, middle plate 34, and bottom plate 32 may then be secured together in known fashion and subjected to heat and pressure to partially cure or semi-cure the polyolefin and rubber, thereby forming a partially cured or semi-cured midsole member 22 formed of a polyolefin and a partially cured or semi-cured outsole member 24 formed of rubber.

In certain embodiments, mold assembly 30 is maintained at a temperature between approximately 155° C. and approximately 175° C. for a time interval between approximately 30 seconds and approximately 1.5 minutes. In certain embodiments, the mold assembly is subjected to heat for a time that is between approximately 10% and approximately 20% of the total cure time for the rubber.

It is to be appreciated that in certain embodiments, the polyolefin and the rubber may be heated to different temperatures. For example, the polyolefin may be subjected to heat such that it reaches a temperature of approximately 175° C. while the rubber is subjected to heat such that it reaches a temperature of approximately 155° C. This may be accomplished by preheating the different plates of mold assembly 30 to different temperatures. For example, top plate 36 may be preheated to approximately 175° C. while bottom plate 32 may be preheated to approximately 155° C.

Mold assembly 30 is then opened, and middle plate 34 is removed from mold assembly 30. At this point, the partially cured or semi-cured midsole member 22 is retained within second portion 58 of upper recess 40 due to the construction of second portion 58, including, for example, its sidewall design. Top plate 36 is then placed on bottom plate 32, as seen in FIG. 5, with partially cured or semi-cured midsole member 22 positioned above outsole member 24. Heat and pressure are then applied to mold assembly 30. During this stage, the polyolefin expands into sole recess 42, taking on its final form by expanding against the surface of sole recess 42. Sole recess 42 has a size that is larger than that of the combined size of lower recess 38 and upper recess 40, as discussed in greater detail below.

During this stage, the polyolefin and rubber cross-ink and bond to one another to form a cured sole assembly 10. The cross-inking provides the sole bonding between the polyolefin and the rubber, and no adhesives or other materials or devices are needed to bond the polyolefin and rubber to one another.

Mold assembly 30 is then cooled to further stabilize sole assembly 10. In certain embodiments, mold assembly 30 is cooled to approximately 10° C. for approximately 600 seconds. Once the cooling step is completed, mold assembly 30 is opened, and sole assembly 10 is removed. After removing sole assembly 10 it may be trimmed to remove any flash on its exterior surface, and may undergo other typical post cure processing steps including, for example, buffing and washing.

Sole assembly 10 is fully formed and cured when it is removed from mold assembly 10, and is sized in a 1:1 relationship with respect to sole recess 42. Thus, the final exterior surface of sole assembly 10 will be a mirror image of the interior surface of sole recess 42 in mold assembly 30. There is no further expansion or contraction of the elements of sole assembly 10 once it is removed from mold assembly 30, outside of the standard shrinkage of between approximately 1% and approximately 3%.

A second embodiment of a method of forming sole assembly 10 with mold assembly 30 will now be described in greater detail. Mold assembly 30 is preheated to a temperature between approximately 155° C. and approximately 175° C. A quantity of raw rubber is placed in first portion 46 of lower recess 38, and then middle plate 34 is placed on top of bottom plate 32. Top plate 36 is then placed on middle plate 34, and top plate 36, middle plate 34, and bottom plate 32 are secured together in known fashion and subjected to heat and pressure to partially cure or semi-cure the rubber, thereby forming a partially cured or semi-cured outsole member 24 formed of rubber.

In certain embodiments, mold assembly 30 is maintained at a temperature of approximately 155° C. for approximately 200 seconds, thereby forming a partially cured or semi-cured rubber outsole member 24. Mold assembly 30 is then opened, and middle plate 34 is removed from mold assembly 30. A quantity of raw polyolefin material, in any desired form, is then placed on top of the partially cured or semi-cured outsole member 24 in sole recess 42. Top plate 36 is then placed on bottom plate 32 with the raw polyolefin material positioned on outsole member 24 within sole recess 42. Heat is maintained and pressure is applied to mold assembly 30. In certain embodiments, mold assembly 30 is subjected to approximately 155° C. for approximately 900 seconds. The polyolefin expands and crosslinks and bonds to the rubber, without the use of adhesives or any other materials or devices.

During this stage, the polyolefin expands into sole recess 42, taking on its final form by expanding against the surface of sole recess 42. As noted above, sole recess 42 has a size that is larger than that of the combined size of lower recess 38 and upper recess 40, as discussed in greater detail below.

Mold assembly 30 is then cooled to further stabilize sole assembly 10. In certain embodiments, mold assembly 30 is cooled to approximately 10° C. for approximately 600 seconds. Once the cooling step is completed, mold assembly 30 is opened, and sole assembly 10 is removed. After removing sole assembly 10 it may be trimmed to remove any flash on its exterior surface, and may undergo other typical post cure processing steps including, for example, buffing and washing.

The configuration of various parts of mold assembly 30 will now be discussed in greater detail. As seen in FIG. 6 and noted above, bottom plate 32 defines first portion 46 of lower recess 38. First portion 46 is formed as a recess in top surface 44 of bottom plate 32, having a sidewall 64 extending about its periphery. In certain embodiments, bottom plate 32 is thicker in the area where forefoot region 12 and midfoot region 14 of outsole 24 is formed. This allows for outsole 24 to have a forward peripheral wall 66 formed about forefoot region 12 and midfoot region 14, as seen in FIGS. 1 and 3. Outsole 24 may also include a rear peripheral wall 67 extending about heel region 16.

In certain embodiments, first portion 46 of lower recess 38 may include one or more surface irregularities 68 that produce corresponding surface irregularities in the surface of outsole 24. Surface irregularities 68 can have any desired form and may be positioned at any desired location within first portion 46. In the embodiment illustrated in FIG. 6, a plurality of ribs 70 in a grid format or array are positioned on the bottom surface of first portion 46. These ribs 70 naturally form a corresponding grid or array of grooves on the bottom surface of outsole 24, thereby providing lugs for outsole 24 in order to improve the grip or traction of outsole 24. In the illustrated embodiment, a rib 70 is also formed on sidewall 64, which serves to form groove 27 in peripheral wall 66 of outsole 24. It is to be appreciated that any elevation or projection on first portion 46 of lower recess 38 will cause a corresponding groove, depression, or recess to be formed on the exterior surface of outsole 24. Similarly, any groove, depression, or recess formed in the surface of first portion 46 will cause a corresponding elevation or projection to be formed on the exterior surface of outsole 24.

It is to be appreciated that any portion of mold assembly 10 may include any number of surface irregularities, having any desired shape, that are configured to produce mating surface irregularities in midsole 42. Thus the surface of midsole 42 can easily be modified for performance or aesthetic benefits through the use of surface irregularities in mold assembly 10.

It is to be appreciated that the surface irregularities on first portion 46, or any other portion of mold assembly 10, can include a micro-textured surface, which are extremely small elevations or depressions on the surface of mold assembly 10. Such elevations or depressions may range in size from approximately one tenth of a millimeter up to one 10,000th of a millimeter. Such a micro-textured surface can assist in the release of air bubbles during the molding process, which provides improved aesthetics, including a more desirable finish for the surface of the footwear. A micro-textured surface may be produced in known fashion by etching or other known techniques.

Figure 7:
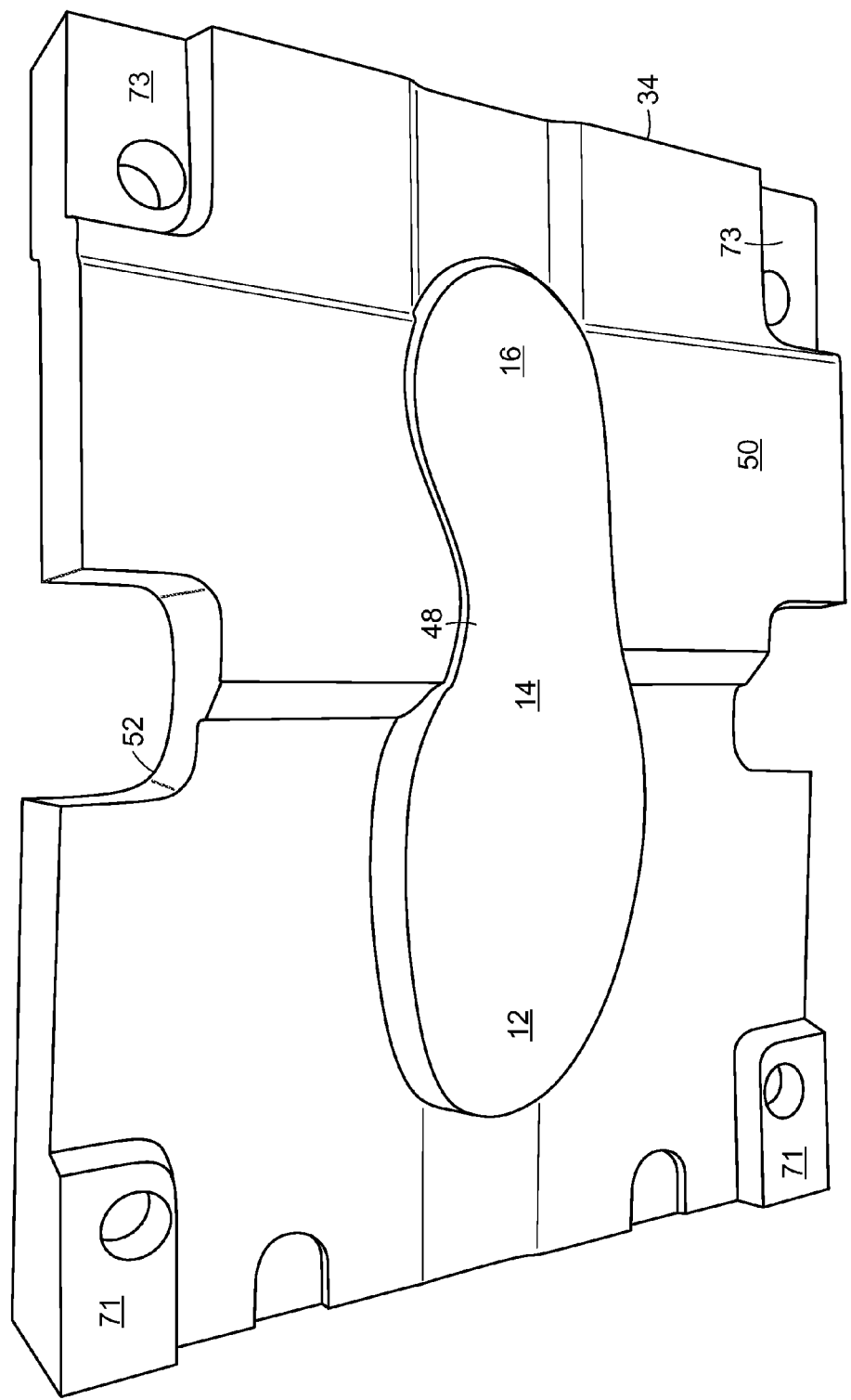
FIG. 7 is a perspective view of a bottom of the middle plate of the mold assembly of FIG. 4.

As noted above, a second portion 48 of bottom recess 38 is defined by a bottom surface 50 of middle plate 34. As seen in FIG. 7, second portion 48 may be in the form of a projection. Second portion 48 is thicker in the area of forefoot region and 12 and into midfoot region 14 in order to help form forward peripheral wall 66, as discussed above.

Each of the plates 32, 34, 36 of mold assembly 30 may include plate projections 71 and recesses 73 that mate with corresponding recesses 73 and projections 71 in the adjacent plates when mold assembly is put together, ensuring that they are properly aligned and registered with respect to one another. As illustrated here, projections 71 and recesses 73 are positioned on the corners of plates 32, 34, and 36. It is to be appreciated that projections 71 and recesses 73 can be positioned at any desired locations on plates 32, 34, and 36.

Figure 8:
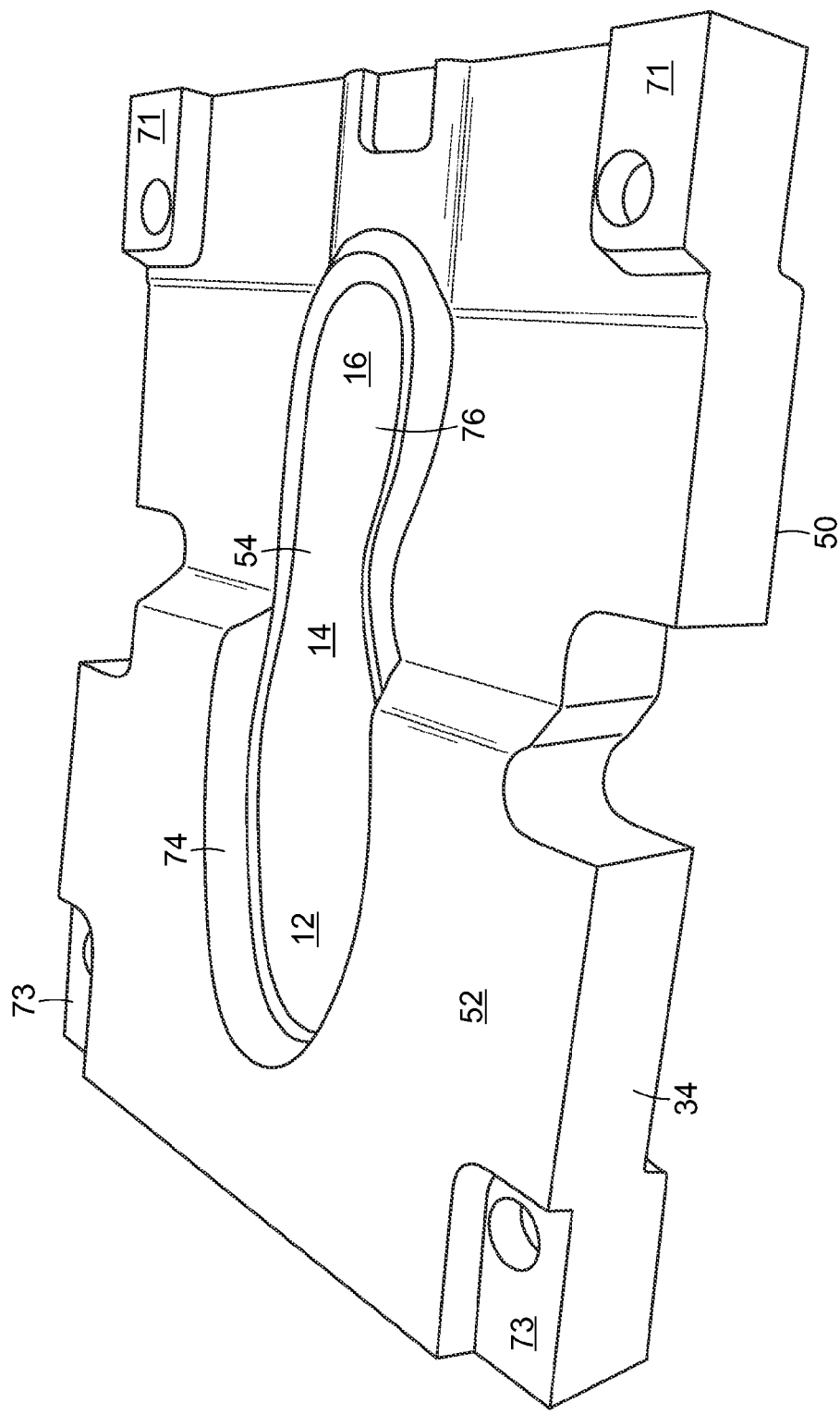
FIG. 8 is a perspective view of a top of the middle plate of the mold assembly of FIG. 4.

The top surface 52 of middle plate 34 can be seen in FIG. 8. First portion 54 of upper recess 40 includes a forward recess 74 formed in forefoot region 12 and a portion of midfoot region 14. First portion 54 then transitions to a rear projection 76 positioned in heel region 16 and a portion of midfoot region 14.

Figure 9:
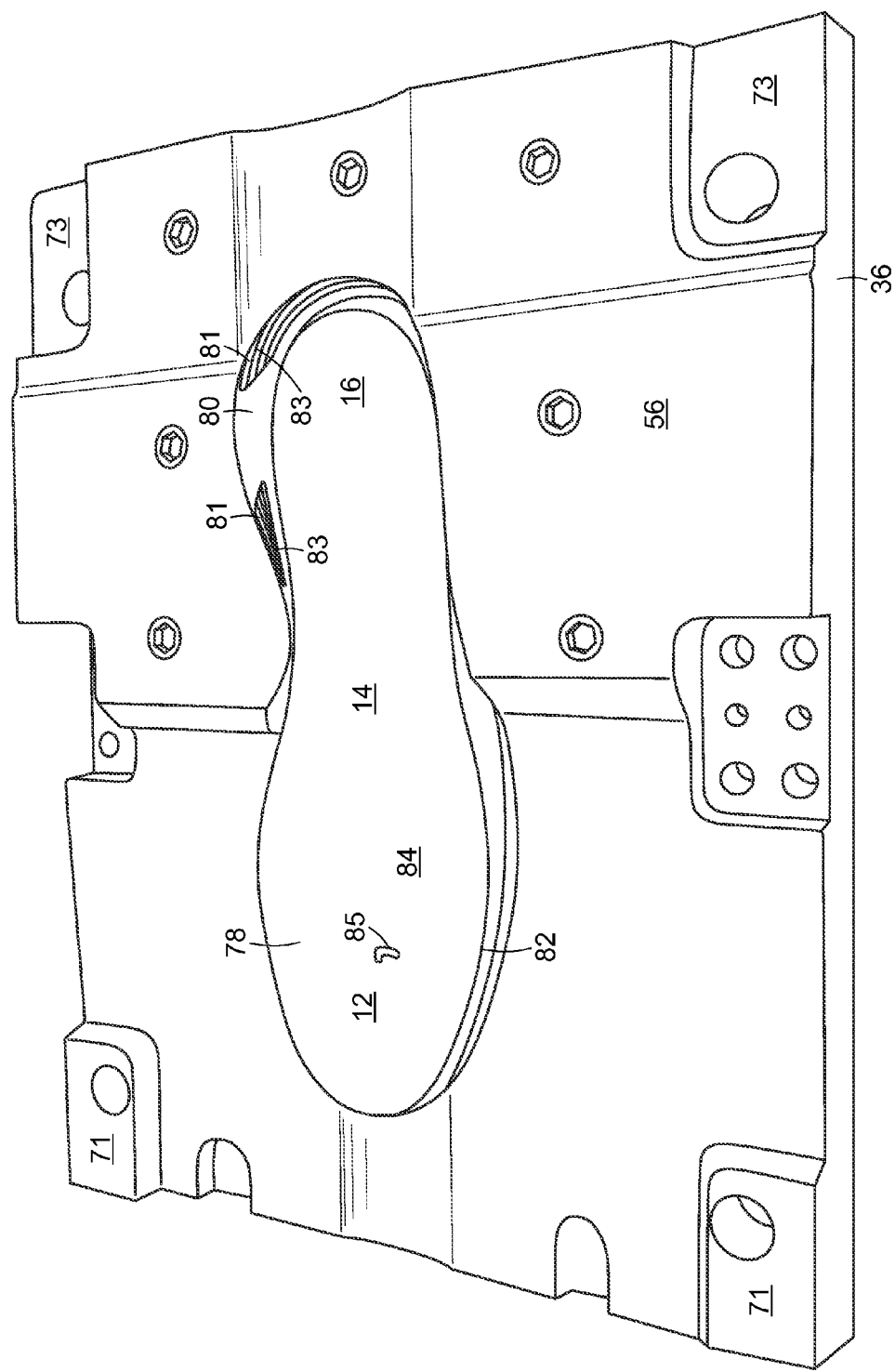
FIG. 9 is a perspective view of a bottom of the top plate of the mold assembly of FIG. 4.
Figure 10:
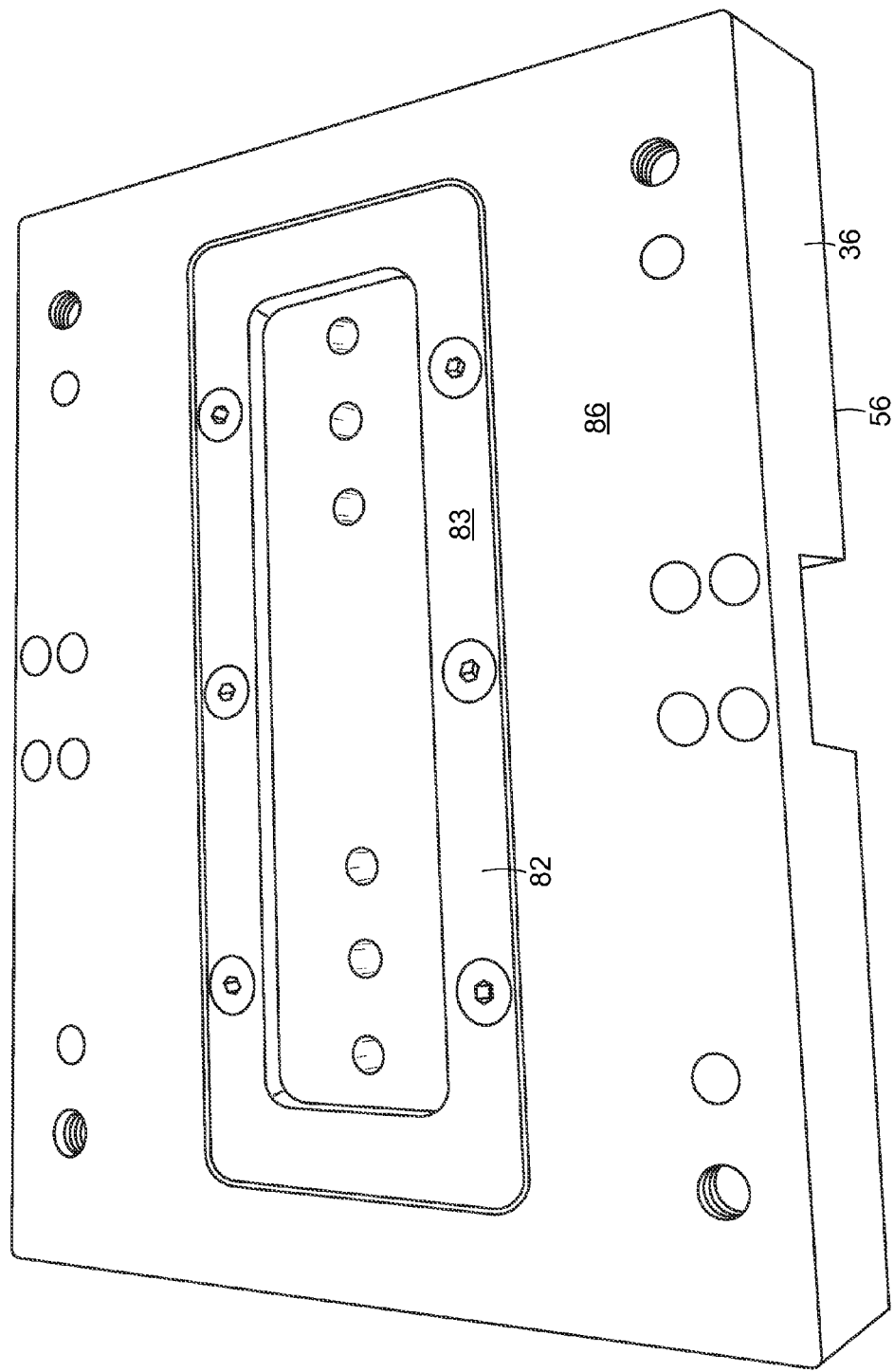
FIG. 10 is a perspective view of a top of the top plate of the mold assembly of FIG. 4.

The bottom surface 56 of top plate 36 can be seen in FIG. 9. Second portion 58 of upper recess 40 includes a forward projection 78 positioned in forefoot region 12 and a portion of midfoot region 14 extending outwardly from bottom surface 56. Second portion 58 then transitions to a rear recess 80 formed in bottom surface 56 and positioned in heel region 16 and a portion of midfoot region 14. As discussed above, second portion 58 cooperates with first portion 54 on middle plate 34 to define upper recess 40. A plurality of ribs 81 may be formed in the wall of rear recess 80. Ribs 81 and the corresponding recesses 83 formed between adjacent ribs 81 serve to form the corresponding grooves 28 and ribs 26, respectively, on heel portion 16 of midsole member 22 formed in upper recess 40. Ribs 81 may also serves as retaining members, ensuring that midsole member 22 stays in upper recess 40 when the plates of mold assembly 10 are separated.

It is to be appreciated that one or more additional or separate retaining members can be added to bottom surface 56 of top plate 36. For example, a retaining member such as a projection 85 could extend outwardly from forefoot region 12. Naturally, projection 85 would form a recess in the surface of midsole member 22.

As discussed above, sole recess 42, which is formed by bottom plate 32 and top plate 36, may have a volume that is greater than a volume of upper recess 40. This can be accomplished by manipulating top plate 36. In particular, a movable plate insert 82 can be used as part of top plate 36 to define both second portion 58 of upper recess 40 as well as second portion 62 of sole recess 42.

Figure 11:
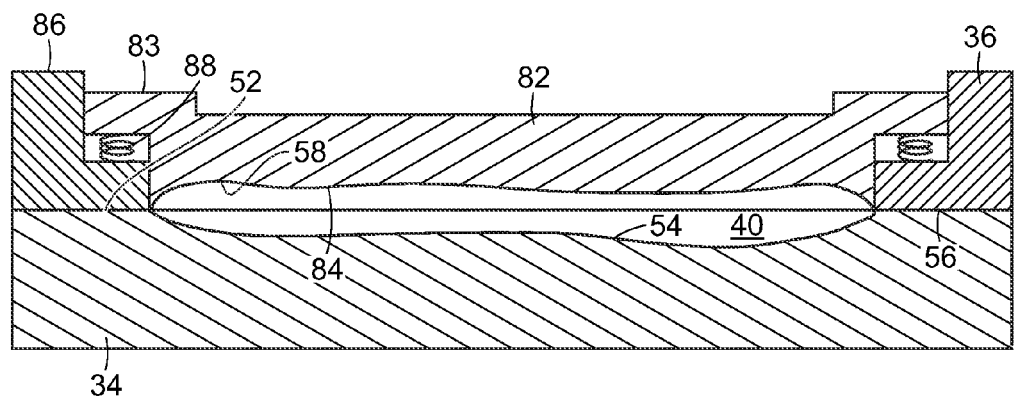
FIG. 11 is a section view of the middle plate and top plate of the mold assembly of FIG. 4.
Figure 12:
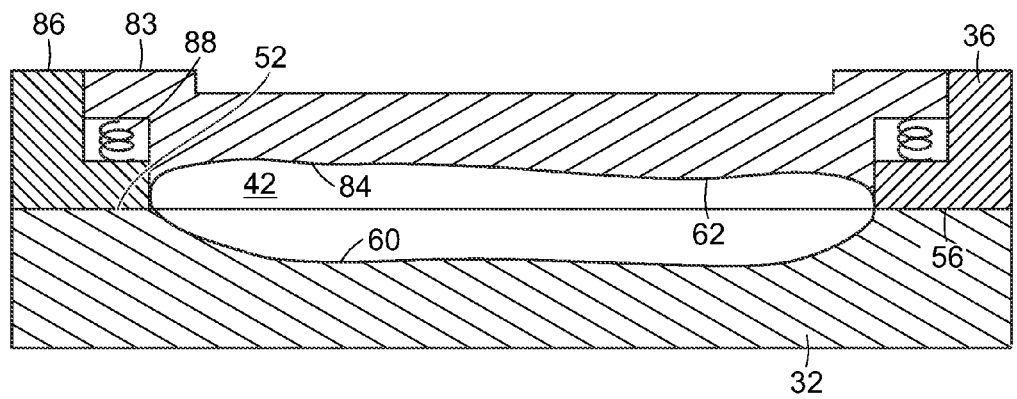
FIG. 12 is a section view of the top plate and bottom plate of the mold assembly of FIG. 4.

In FIG. 11, movable plate insert 82 is seen in its first or lowered position, where its lower surface 84 defines second portion 58 of upper recess 40. In this first lowered position, an upper surface 83 of plate insert 82 is seen positioned below an upper surface 86 of top plate 36. Movable plate insert 82 is seen in FIG. 12 in its second or raised position, where its lower surface 84 is raised to define second portion 62 of sole recess. In this second raised position, upper surface 83 of plate insert 82 is seen positioned substantially flush with upper surface 86 of top plate 36.

Movable plate insert 82 may be biased upwardly by a biasing member, such as springs 88 positioned between movable plate insert 82 and a portion of top plate 36. It is to be appreciated that springs 88 can be coil springs or any desired spring member, and that other types of biasing members can be used to create a biasing force acting to move movable plate insert 82 upwardly.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of forming a sole assembly with a mold assembly comprising the steps of:
   using a top plate having a bottom surface and including a movable insert having a bottom surface; a middle plate positioned beneath the top plate and having a top surface and a bottom surface, the bottom surface of the movable insert and the top surface of the middle plate cooperating to define an upper recess therebetween; and a bottom plate positioned beneath the middle plate and having a top surface, the top surface of the bottom plate and the bottom surface of the middle plate cooperating to define a lower recess therebetween; wherein the bottom surface of the movable insert and the top surface of the bottom plate are configured such that when the top plate and bottom plate are in contact with one another they cooperate to define a sole recess, the sole recess having a volume that is larger than a volume of the upper recess and a volume of the lower recess combined;
   preheating the bottom plate, middle plate, and top plate;
   placing a quantity of rubber in a first portion of the lower recess;
   placing the lower surface of the middle plate in contact with the upper surface of the bottom plate, and the bottom surface of the upper plate in contact with the upper surface of the middle plate;
   subjecting the top plate, middle plate, and bottom plate to heat to semi-cure the rubber in the lower recess to form an outsole member;
   separating the top plate, the middle plate, and the bottom plate;
   moving the movable insert upwardly with respect to the top plate;
   placing the lower surface of the top plate in contact with the upper surface of the bottom plate, wherein a quantity of a polyolefin forming a midsole member is in the sole recess above the semi-cured rubber;
   subjecting the top plate and bottom plate to heat such that the polyolefin expands within the sole recess and the polyolefin and rubber in the sole recess fully cure, crosslink, and bond to one another to form a sole assembly for an article of footwear;
   cooling the top plate and the bottom plate; and
   removing the top plate from the bottom plate and removing the sole assembly from the sole recess.

2. The method of claim 1, wherein the movable insert is biased upwardly by a biasing member.

3. The method of claim 2, wherein the biasing member is a spring.

4. The method of claim 1, wherein an upper surface of the movable insert is substantially flush with an upper surface of the top plate after the movable insert has been moved upwardly.

5. The method of claim 1, wherein the rubber is semi-cured in the lower recess at a temperature of approximately 155° C. for approximately 200 seconds.

6. The method of claim 1, wherein the rubber and the polyolefin are fully cured in the sole recess at a temperature of approximately 155° C. for approximately 900 seconds.

7. The method of claim 1, further including the step of placing a quantity of polyolefin in the upper recess before the step of semi-curing the rubber, wherein the polyolefin is semi-cured when the rubber is semi-cured.

8. The method of claim 7, wherein the polyolefin is in the form of one of a sheet and pellets when it is placed in the upper recess.

9. The method of claim 1, wherein the rubber is in the form of one of a sheet and pellets when it is placed in the lower recess.

10. The method of claim 1, wherein the upper recess includes at least one surface irregularity to form a pattern on the midsole member formed in the upper recess.

11. The method of claim 10, wherein at least one surface irregularity comprises one of a projection and a recess.

12. The method of claim 1, wherein the lower recess includes at least one surface irregularity to form a pattern on the outsole member formed in the lower recess.

13. The method of claim 12, wherein at least one surface irregularity comprises one of a projection and a recess.

14. The method of claim 1, wherein the polyolefin includes at least one of a curing agent and a blowing agent.

15. The method of claim 1, wherein the rubber includes a curing agent.

16. A method of forming a sole assembly with a mold assembly comprising the steps of:
   using a top plate having a bottom surface and including a movable insert having a bottom surface; a middle plate positioned beneath the top plate and having a top surface and a bottom surface, the bottom surface of the movable insert and the top surface of the middle plate cooperating to define an upper recess therebetween; and a bottom plate positioned beneath the middle plate and having a top surface, the top surface of the bottom plate and the bottom surface of the middle plate cooperating to define a lower recess therebetween; wherein the bottom surface of movable insert and the top surface of the bottom plate are configured such that when the top plate and bottom plate are in contact with one another they cooperate to define a sole recess, the sole recess having a volume that is larger than a volume of the upper recess and a volume of the lower recess combined:

preheating the bottom plate, middle plate, and top plate;

placing a quantity of rubber in a first portion of the lower recess;

placing the lower surface of the middle plate in contact with the upper surface of the bottom plate;

placing a quantity of a polyolefin in a first portion of the upper recess;

placing the lower surface of the upper plate in contact with the upper surface of the middle plate;

subjecting the top plate, middle plate, and bottom plate to heat to semi-cure the rubber in the lower recess to form an outsole member and to semi-cure the polyolefin in the upper recess to form a midsole member;

separating the top plate, the middle plate, and the bottom plate;

moving the movable insert upwardly with respect to the top plate;

placing the lower surface of the top plate in contact with the upper surface of the bottom plate such that the semi-cured polyolefin midsole member contacts the semi-cured rubber outsole member in the sole recess;

subjecting the top plate and bottom plate to heat such that the polyolefin expands within the sole recess and the polyolefin and rubber in the sole recess fully cure, cross-link, and bond to one another to form a sole assembly for an article of footwear;

cooling the top plate and the bottom plate; and removing the top plate from the bottom plate and removing the sole assembly from the sole recess.

17. The method of claim 16, wherein the movable insert is biased upwardly by a biasing member.

18. The method of claim 17, wherein the biasing member is a spring.

19. The method of claim 16, wherein an upper surface of the movable insert is substantially flush with an upper surface of the top plate after the movable insert has been moved upwardly.

20. The method of claim 16, wherein the upper recess includes at least one surface irregularity to form a pattern on the midsole member formed in the upper recess, and the lower recess includes at least one surface irregularity to form a pattern on the outsole member formed in the lower recess.

* * * * *